J. C. VAUGHN.
Making Car Wheels.
No. 8,173.
Patented June 24, 1851.
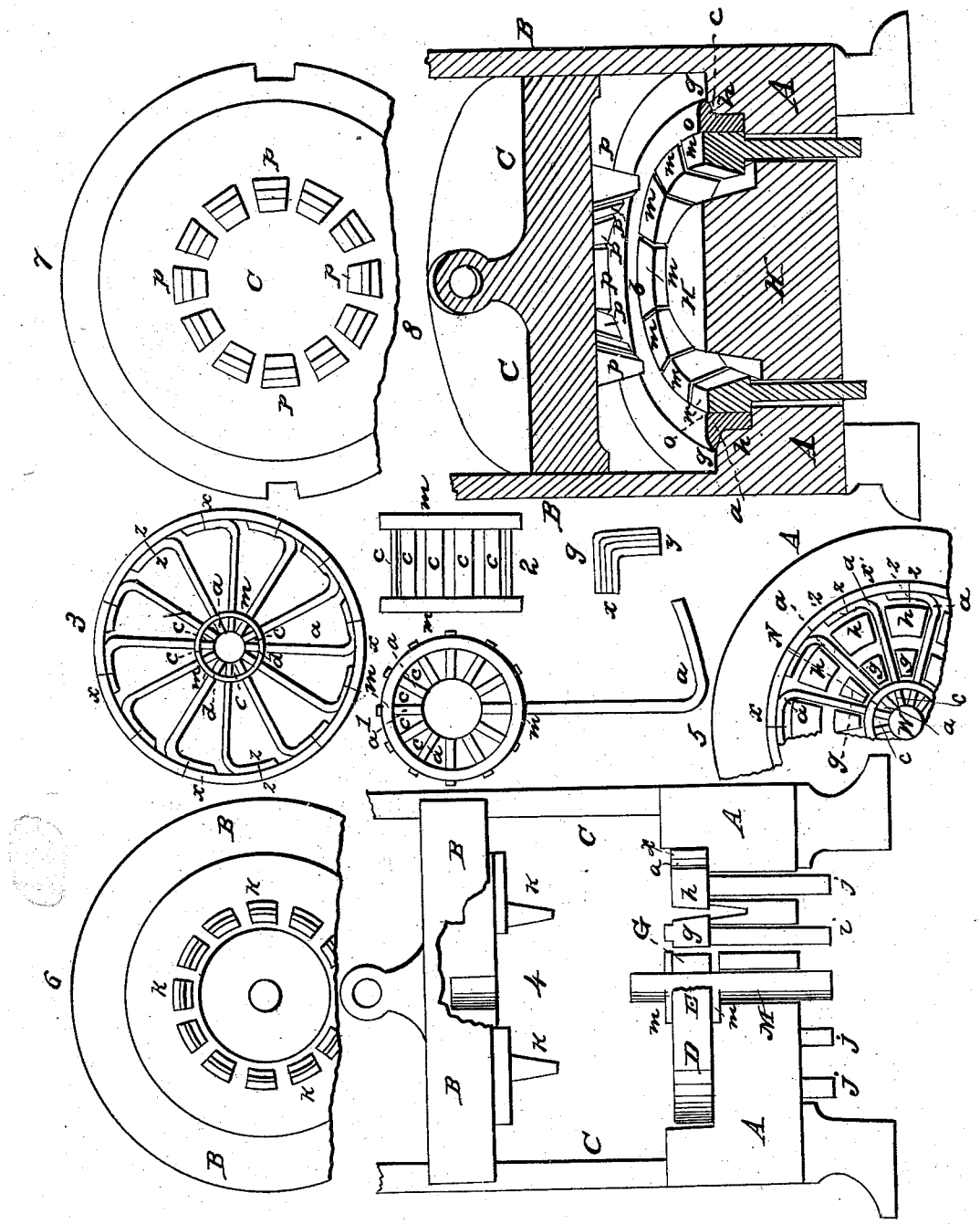

UNITED STATES PATENT OFFICE.

MARIA VAUGHN, ADMINISTRATRIX OF JOSEPH C. VAUGHN, DECEASED, OF GREENBUSH, NEW YORK, ASSIGNOR TO JAMES C. BELL AND ROBERT CHRISTIE, JR.

MACHINERY FOR MAKING WROUGHT-IRON CAR-WHEELS.

Specification of Letters Patent No. 8,173, dated June 24, 1851.

*To all whom it may concern:*

Be it known that JOSEPH C. VAUGHN, deceased, of the town of Greenbush, county of Rensselaer, State of New York, in his lifetime invented a new and useful Process for Making Railroad-Car Wheels and Wheels for other Purposes of Wrought-Iron and of New and Peculiar Machinery for Effecting said Process; and I declare the following specification, with the drawings appended thereto and referred to therein as forming a part thereof, to be a full and complete description of the same.

The iron used in the construction of the wheel is of various forms and sizes, and such as can be prepared by the ordinary process of making bar-iron. It is so prepared and then cut from the bar into the lengths required for the sizes of the various members of wheels.

To form the hub the material is from iron rolled into prismatic bars whose cross section is isosceles triangular (thus $\triangledown$ or the same truncated thus $\triangledown$) as shown at C, C, in the various drawings, these prisms being proportional to the size of the hub and the size and number of spokes to be inserted therein. The bars being cut into pieces, of the length of the hub, are placed in the positions shown in Figures 1 and 2 c, c, c, around a temporary axle.

To form the tire of the wheel X X Figs. 3, 4, 5, a flat bar of iron of proper width and thickness is bent around in a circle of the required circumference and has its ends welded smoothly together. This being placed concentric with the hub the spokes are cut from flat bar iron of the width and thickness required, and of the proper length so that when inserted between the prismatic pieces of the hub, and bent to lie just inside of the tire, they may reach, as shown at Figs. 3 and 5, from the eye of hub to the tire with their bent arms nearly from one spoke to the next one, or if it be not necessary to make the bent arm reach from spoke to spoke, then so far as to make a good and sufficient welding surface between the tire and spokes. The spokes are now to be secured to the tire by a small rivet Z, or in any other convenient way, and the parts forming the hub also secured by the hoops or rings M, M, and then the wheel is ready for the welding process, the small oblong spaces left under the rings M, M, and between the $\triangledown$ shaped bars, being first fitted up with corresponding pieces of iron.

The machinery in and by which the process of welding is to be performed is represented by Figs. 4, and 5, and 6. Fig. 4 A A represents a vertical section through the center of a cylindrical metal box whose internal diameter is a very little larger than that of the wheel just described. The bottom of this box is formed into a die or mold (as the profile of its section shows) to correspond with the intended shape of one side of the finished wheel. On the bottom are placed iron blocks represented in profile at g, h Fig. 4, and in plan Fig. 5. They are shaped and fitted to lie between the spokes of the wheel described, and nearly fill up the spaces between the hub tire and spokes, as will be seen on the plan Fig. 5, where the wheel is shown lying on the bottom of the box or matrix and the blocks or welders g, h, lying in their places. Each of the blocks has an oblong narrow fin i, j, from its bottom extending below the outside bottom of the box through a narrow radial slot; the object of this being not only to guide the blocks when operating, but by means of their projecting fins, to move them, whenever it should become necessary. Each pair of these blocks, excepting when in operation are kept, close to each other, by springs of any kind, attached to the fins below the bottom of the box and set to press toward each other.

Through the center of the bottom of the box or mold, there is a circular hole, for the passage of a mandrel M which is of the diameter required for the eye or bore of the hub. This mandrel may if required be attached to the hammer or ram, to be described yet loosely so as to detach itself after the blow of the machine. Over the mold a heavy hammer or ram B, B, Figs. 4 and 6 traverses up and down guided and kept from turning by slides C, C. The lower face of this ram is formed into a die corresponding with the intended shape of the side of the wheel, not formed by the bottom of the mold, as shown by its section Fig. 4. On this lower face, there are fixed directly over the points where the blocks g, h, touch each other, wedges k, k, shown in plan at Fig. 6 and in profile at Fig. 4. The edges of the blocks g, h, are sloped or beveled each at the angle corresponding to the side of the wedge that faces toward it, so that when the ram is lowered, and the wedges entered between the blocks, they shall be forced outward from each other with a steady horizontal movement. If it be deemed expedient instead of using the single ram with the wedges attached, it may be divided into two parts, a lower section as just described with the wedges attached, and an upper section, simply a weight or ram by which several blows can be struck upon the lower section without removing that lower section with its wedges.

The process of making the wheel is as follows: The various parts being secured together as above described, the whole fabric is subjected to a welding heat in a suitable furnace; and when heated sufficiently is laid quickly into the bottom of the mold A, A, as shown in Fig. 4 where D, E, G, $a$, $x$, represents the wheel the part from D to E showing the face of the tire and the part G $a$ $x$, being a section through the wheel at W N as shown in Fig. 5. The instant that the wheel is in its bed in the mold the ram is brought down with great power forcing the wedges between the welding blocks and pressing them apart; the blocks $g$, $g$, pressing the component parts of the hub against the mandrel, and the blocks $h$, $h$, pressing the curved arms of the spokes with the tire against the inner wall of the mold A, A. At the same time, the blow of the ram compresses or upsets the edges of the tire, spokes and hub between its face and the bottom of the mold, the joint operation of which pressures, results in the compressing and welding of the separate parts of the wheel firmly together, and giving it a proper form. This makes a wrought iron wheel for ordinary use, but for a railroad car wheel it is necessary to add the outer or flanged tire for which the wheel is now ready.

I claim the machinery and apparatus set forth and described in Figs. 1, 2, 3, 4, 5, 6, to wit the mold, blocks or welders the hammer or ram with the wedges thereto attached, and the mandrel in combination with each other, for the purpose of making wrought iron wheels, substantially as set forth in this specification.

MARIA VAUGHN,

*Administratrix of the Estate of Joseph C. Vaughn, deceased.*

Witnesses:
H. GOODRICH,
JAMES DEARSTYNE.